United States Patent [19]

Eastman

[11] Patent Number: 5,269,334

[45] Date of Patent: Dec. 14, 1993

[54] FLUID FLOW CONTROL SYSTEM

[75] Inventor: Michael D. Eastman, Endwell, N.Y.

[73] Assignee: New York State Electric & Gas Corporation, Binghamton, N.Y.

[21] Appl. No.: 902,220

[22] Filed: Jun. 22, 1992

[51] Int. Cl.$^5$ ............................................. G05D 7/06
[52] U.S. Cl. ........................................ 137/12; 137/110
[58] Field of Search ............ 137/110, 118, 486, 487.5, 137/12

[56] References Cited

U.S. PATENT DOCUMENTS

| | | | |
|---|---|---|---|
| 2,949,125 | 8/1960 | Gilmore | 137/110 X |
| 3,158,174 | 11/1964 | Stalnecker | 137/486 X |
| 3,369,561 | 2/1968 | Zimmerman | 137/486 |
| 3,470,896 | 10/1969 | Werter | 137/110 |
| 3,555,901 | 1/1971 | Delatorre | |
| 4,481,967 | 11/1984 | Frick | 137/85 |
| 4,561,458 | 12/1985 | Hoffmann | 137/110 X |
| 4,690,163 | 9/1987 | Steinemann | 137/486 X |

Primary Examiner—Robert G. Nilson
Attorney, Agent, or Firm—Salzman & Levy

[57] ABSTRACT

The present invention features a system for actuating additional fluid flow lines at a transfer station, without the continuous venting or bleeding of fluid. The transfer station operates its supply lines, or runs, at differential pressures ranging from 15 to 85 inches of water. It is desirable to maintain differential pressure in the primary line, or in the combination of primary and secondary lines at mid-range, at about 50 inches of water. The system of the invention entails replacing the existing constant bleed pneumatic controller with an electromechanical no-bleed controller.

5 Claims, 2 Drawing Sheets

FLUID FLOW CONTROL SYSTEM

FIELD OF THE INVENTION

The present invention pertains to the controls for measuring fluid flow consumption, and, more particularly, to an improved system for controlling the flow of natural gas in a natural gas measuring and transfer station.

BACKGROUND OF THE INVENTION

Many natural gas distribution companies purchase natural gas from gas transmission companies at designated purchase stations, where the amount of natural gas being sold is measured. The natural gas at these purchase stations is heated, measured and reduced in pressure.

Until the late 1970s, archaic orifice meters were used to measure the amount of the gas being transferred from transmission and distribution points. Most of the transfer stations maintained multiple orifice meter runs (supply lines) arranged in parallel. Parallel meter runs were necessary in order to obtain accurate measurements of the gas flow with respect to the measuring instruments' water column range of 0 to 100 inches of water. The measurement was found to be most accurate in the 50-inch (or, the mid-range of differential pressure) measurement. Therefore, gas flowing at 85 inches of water through a primary line, for example, was diverted through a parallel, secondary line. This adjusted the differential pressure in each of the primary and secondary lines to 40 inches of water (the mid-range of the water columns), and avoided exceeding the upper measurement limits of the instruments.

The transmission companies using these multiple run systems typically utilize a constant bleed pneumatic limit flow controller to activate the parallel orifice meter runs In the late 1970s, the use of liquefied natural gas prompted the transmission companies to install sophisticated electronic measuring devices in order to bill their customers for the amount of energy being transferred in each line, rather than measuring the volume of the flowing fluid.

Today, despite the capability for electronic control and measurement of natural gas at each purchase station, the transfer companies are still using the old-fashioned limit flow control equipment for gaseous natural gas transmission.

In order to regulate the gaseous flow between runs, the current constant bleed pneumatic controllers needlessly waste approximately 1,437 standard cubic feet of natural gas each day that they are in operation, i.e., when both runs are allowing gas to flow therethrough. This mode of operation is most prevalent in the winter months, when there is a greater demand for heating fuels. Although only small amounts of gas are being vented, it has been determined that the cumulative costs are great.

The present invention is a system for replacing the constant bleed pneumatic controllers for these transfer stations, thus providing the means by which substantial savings in fuel and money can be realized.

DISCUSSION OF RELATED ART

In U.S. Pat. No. 3,555,901, issued to Delatorre et al on Jan. 19, 1971, for "Method of and Apparatus for Measuring Varying Fluid Flow", a dual-metered line is illustrated having a fluid flow computer which governs the switchover controls. As the flow rate is measured, the fluid, in response thereto, is directed into the alternate line.

The aforementioned system differs from the present invention in that Delatorre et al require a computer to control the flow, and the flow rate in the line must be calculated. The present invention is far less complex, and its cost is minimal. The differential transducer used by the present invention already exists on site at each transfer station. The circuitry of the invention requires only one solenoid valve to do the switching between the runs, instead of the three solenoid valves of the aforementioned patented system.

SUMMARY OF THE INVENTION

In accordance with the present invention, there is provided a system for actuating additional fluid flow lines at a transfer station, without the venting or bleeding of fluid. The transfer station operates its supply lines, or runs, at differential pressures, usually ranging from 15 to 85 inches of water. It is desirable to maintain differential pressure in the primary line, or in the combination of primary and secondary lines at mid-range, of about 50 inches of water. The system of the invention entails replacing the existing constant bleed pneumatic controller with an electromechanical no-bleed control circuit. The circuit of the system includes a differential pressure transducer that provides an electrical signal that indicates the pressure drop across the supply lines. The differential pressure transducer controls a three-way, no-bleed, solenoid control valve that is designed to be ordinarily in the closed position, with the exhaust port open to the atmosphere. This control valve operates in the inventive system with the second fluid flow run in a position that is usually open. This is necessary; if the supply line were closed during a power loss, an excessive pressure drop would result in a shortage of supply. In addition, if this line were indeed closed, a pressure drop greater than 100 inches of water would not be measurable; hence, fluid would be supplied without an accounting thereof.

As fluid flows through the supply line and across the orifice plates of the dual-run system, the differential pressure transducer (which is tapped across the orifice plate in the primary run) measures the pressure drop. An electrical signal is generated that is indicative of this pressure drop. The signal is transmitted to a switching relay. When the upper or lower pressure limits in the primary line are reached, the generated signal will cause the relay to respectively activate or deactivate the three-way, no-bleed, solenoid valve. This will, in turn, allow fluid to flow not only through the primary run, but through both the primary and the secondary runs.

BRIEF DESCRIPTION OF THE DRAWINGS

A complete understanding of the present invention may be obtained by reference to the accompanying drawings, considered in conjunction with the subsequent, detailed description, in which.

DESCRIPTION OF THE PREFERRED EMBODIMENT

Generally speaking, the invention seeks to eliminate the constant bleeding and venting of natural gas in a switching valve that controls the gas flowing through the lines of a purchase station. The bleeding of the gas has never posed a serious problem in the past, due to the very small amounts of waste. However, given this era of greater fuel conservation, these minimal amounts of waste have been shown to eventually accumulate to produce significant losses. The bleed valve of the purchase flow system has been replaced with a non-venting valve and a simplified control apparatus in order to conserve fuel and protect the environment.

Figure 1:
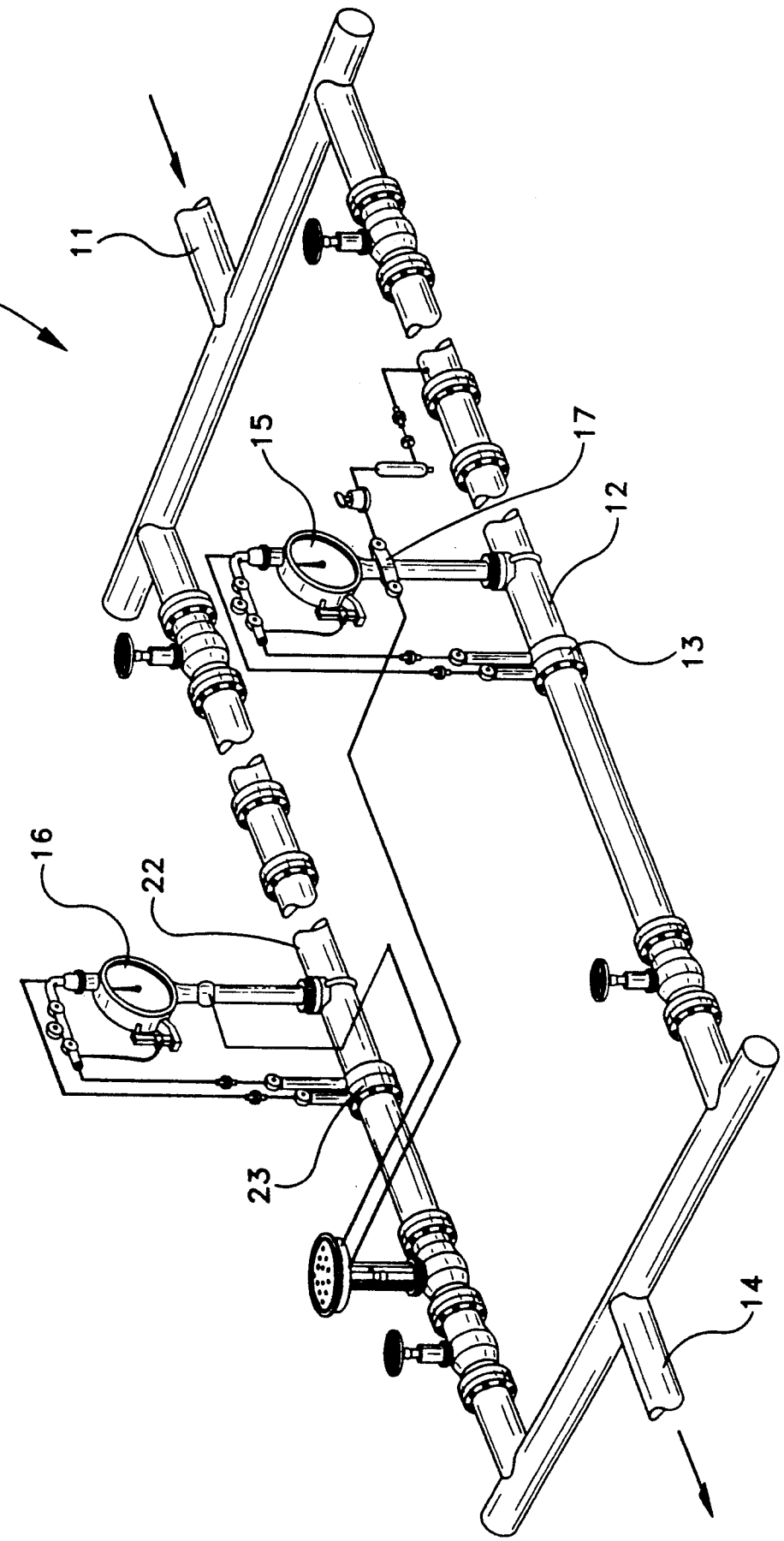
FIG. 1 illustrates a systematic diagram of a prior art purchase station fluid supply system.

Now referring to FIG. 1, a prior art natural gas flow system for a purchase station 10 is illustrated. The purchase station 10 comprises a main supply line 11 for incoming natural gas to be measured, as well as an outgoing, purchaser gas line 14. In order to accurately measure the gas being supplied to the user during high demand periods, it is necessary to divide the gas flow into two gas lines; primary run 12 and secondary run 22 are shown. This is distilled as a result of the measurement process. It has been found that greater measurement accuracy is obtained when measurement of the flow is conducted at mid-pressure range, or approximately 50 inches of water. Therefore, when demand in the primary line 12 approaches the upper measurement limit of 85 inches of water, the flow is switched; it is then carried by the additional secondary run 22, as well as by the primary run 12. In this manner, the flow in both lines will carry a differential pressure of 15.0 inches of water or greater. Similarly, when the pressure drops below 15 inches of water in both lines, it is advantageous to switch the flow back to just one line, i.e., the primary line 12.

Orifices 13 and 23 disposed in each run, 12 and 22 respectively, are set to a certain size. Gauges 15 and 16 respectively measure the differential pressure across each orifice. A bleed-type pressure valve 17 allows for the opening of flow through the secondary run 22 during peak demand periods.

In order to switch the gas flow without the venting or bleeding of natural gas during high demand periods, the present invention then eliminates the bleed-type switching valve 17. This bleed-type valve 17 is now replaced with a three-way, no-bleed, solenoid-actuated valve, which is actuated by the control circuit, shown in FIG. 2.

Figure 2:
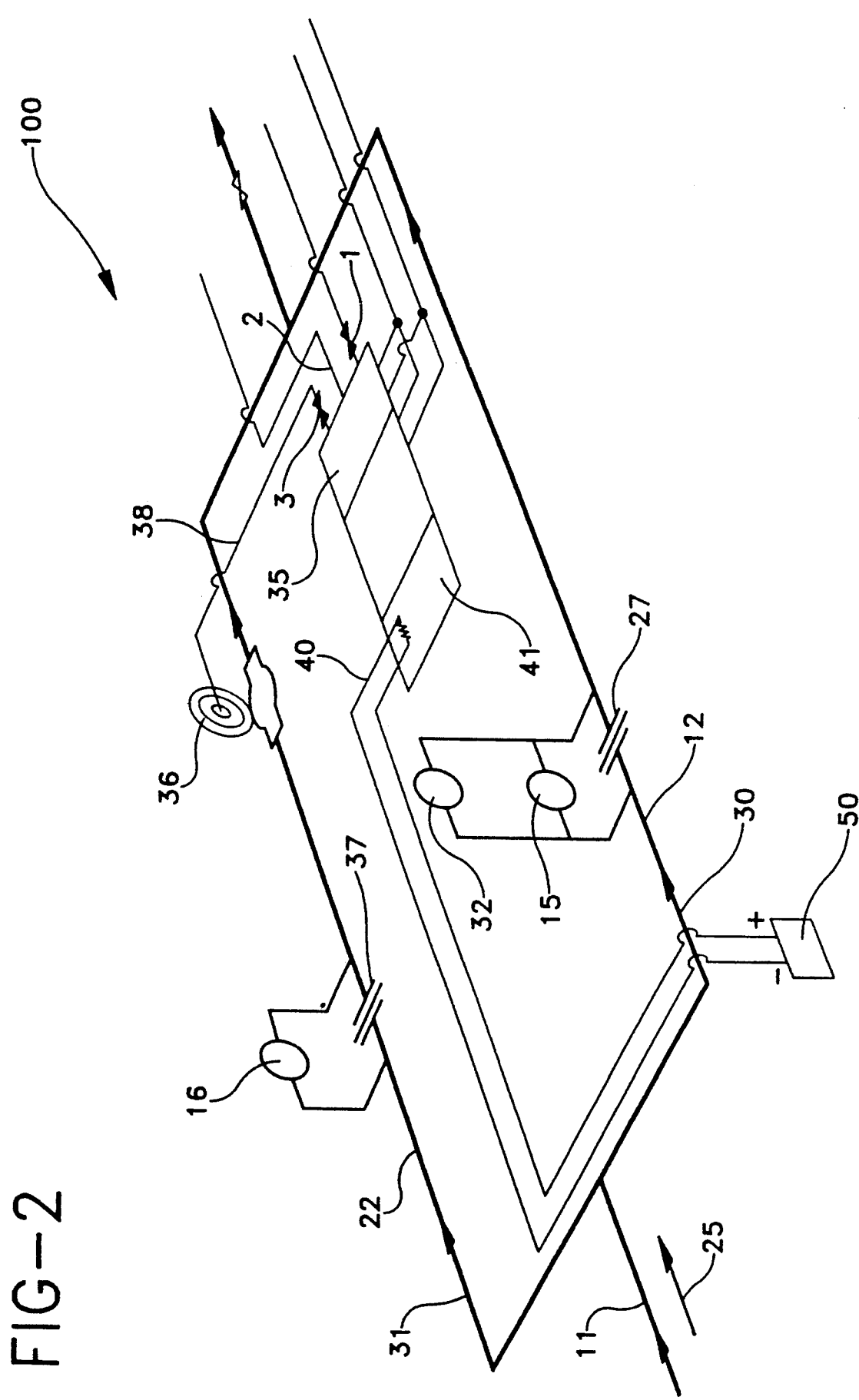
FIG. 2 depicts a schematic diagram of the circuitry of the invention, as applied to the purchase station shown in FIG. 1.

Referring to FIG. 2, a schematic of the control circuit 100 of this invention is illustrated. The natural gas flow (arrow 25) in the incoming supply line 11 is directed to the primary and secondary runs 12 and 22, respectively. Gas flows (arrows 30 and 31) respectively through runs 12 and 22 and passes across respective orifice plates 27 and 37. A differential pressure transducer 32, tapped across the orifice plate 27 of the primary run 12, measures the pressure drop. The differential pressure transducer 32 is manufactured by Honeywell. The transducer 32 will transmit a signal in the range of approximately between 4 and 20 ma, which is proportional to the corresponding pressure range of between 0 and 100 inches of water column drop across the orifice 27. The signal is directed along line 40 to an integrated control circuit 41. The three-way, solenoid valve 35 is of a type similar to that made by the Automatic Switch Company of Florham Park, N.J. (Catalog No. 83206184). When the solenoid is de-energized, port 1 is closed, and ports 2 and 3 are open. When the solenoid is energized, port 2 is closed, and ports 1 and 3 are open. Pressure from the inlet port 1 (15 psig) will be applied to the outlet port 3 in order to close the on-off valve 36 and restrict the flow in the secondary run. Loss of power results in no pressure being applied to the on-off valve 36. The on-off valve is a pressure-to-close valve and will remain open in this circumstance. When the pressure limit of 15 inches is sensed across orifice 27, the signal will correspond to 0.64 v, using a 100 ohm resistor. When the pressure limit of 85 inches is sensed across orifice 27, the signal will correspond to 1.76 v. A relay (not shown) which is part of circuit 41 is actuated by the respective transducer signals to open and close a three-way, no-bleed solenoid valve 35. The relay is a 9-volt, 18 m coil, 120 AC, 1 amp relay powered from a ±15-volt transformer. The three-way solenoid valve 35, manufactured by ASCO, controls the on-off valve 36 disposed in the secondary run 22 via line 38. A 24-volt transformer is used to power the transducer 32.

A high signal of 1.76 v from transducer 32, corresponding to 85 inches of water across orifice 27, will trigger the relay of circuit 41 to output a 0 psig signal to on-off valve 36. This will cause the on-off valve 36 to open the flow in the secondary run 22. A low signal of 0.64 v from transducer 32 will cause the on-off valve 36 to output a 15 psig signal and close or restrict the flow of the secondary run 22.

A flow computer 50, shown connected to transducer 32, can be used to process the signals being generated by the existing electronic measurement equipment in order to calculate the amount of energy transferred. The computer 50, per se, is not part of this invention.

The inventive circuitry herein is very simple, and it utilizes the transducer 32 already available at most purchase station sites for measuring natural gas. The cost of converting the available equipment is minimal, and the retrofitting of each purchase station is quickly amortized by the savings in conserved fuel.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the present invention, what is desired to be protected by Letters Patent is presented in the subsequently appended claims.

What is claimed is:

1. A system for actuating, monitoring or controlling additional fluid flow lines at a transfer station without the venting or bleeding of fluid during high demand periods of fluid flow, comprising:

a primary fluid flow run;

a secondary fluid flow run;

an on-off valve operatively connected within said secondary fluid flow run, said on-off valve operatively restricting flow in said secondary fluid flow run in response to a pressure signal;

a three-way, no-bleed valve, usually in the closed position, with an exhaust port open to the atmosphere, said three-way no-bleed valve being connected to said on-off valve, said three-way, no-bleed valve providing a pressure signal in response to a received electrical signal; and a transducer operatively connected to said primary fluid flow run for generating electrical signals in response to fluid flow pressure in said primary fluid flow run, a high signal from said transducer corresponding to a high flow pressure in said primary run which will generate a signal to trigger said three-way, no-bleed valve and cause the three-way, no-bleed valve to signal said on-off valve to open the flow in the secondary run, and a low signal generated from said transducer corresponding to a low flow pressure that will cause the three-way, no bleed valve to signal said on-off valve to restrict the flow of the secondary run.

2. The system in accordance with claim 1, wherein said transducer is connected across an orifice disposed in said primary fluid flow run.

3. The system in accordance with claim 1, wherein said transducer will generate high and low electrical signals in response to respective high and low pressure limits in said primary fluid flow run, or subsequent runs as dictated by flow requirements.

4. The system in accordance with claim 3, further comprising a control circuit including a relay, said control circuit operatively disposed between said transducer and said three-way, no-bleed valve, whereby a high electrical signal from said transducer will actuate said relay, causing said three-way, no-bleed valve to close, thereby opening said on-off valve.

5. The system in accordance with claim 1, wherein said three-way, no-bleed valve is solenoid-actuated.

* * * * *